United States Patent [19]

Yamaguchi et al.

[11] Patent Number: 4,471,425
[45] Date of Patent: Sep. 11, 1984

[54] A DATA TRANSFER CONTROL SYSTEM FOR MULTIPLE UNITS ON A COMMON BUS USING A SERIALLY TRANSMITTED TRANSFER PERMISSION SIGNAL

[75] Inventors: Taihei Yamaguchi, Yamato; Hirotoshi Haida, Atsugi; Nobuaki Sato, Yamato, all of Japan

[73] Assignee: Panafacom Limited, Yamato, Japan

[21] Appl. No.: 237,151

[22] PCT Filed: Jun. 19, 1980

[86] PCT No.: PCT/JP80/00137
§ 371 Date: Feb. 22, 1981
§ 102(e) Date: Feb. 18, 1981

[87] PCT Pub. No.: WO81/00025
PCT Pub. Date: Jan. 8, 1981

[30] Foreign Application Priority Data

Jun. 22, 1979 [JP] Japan ................. 54-79564

[51] Int. Cl.³ .................. G06F 15/16; G06F 1/04
[52] U.S. Cl. .................................................. 364/200
[58] Field of Search ........................... 364/200, 900

[56] References Cited

U.S. PATENT DOCUMENTS

| | | |
|---|---|---|
| Re. 31,182 | 3/1983 | Crager et al. .................. 178/3 |
| 3,480,914 | 11/1969 | Schlaeppi .................. 340/172.5 |
| 3,551,892 | 12/1970 | Driscoll, Jr. .................. 364/200 |
| 3,959,775 | 5/1976 | Valassis et al. .................. 340/172.5 |
| 4,040,028 | 8/1977 | Tauker et al. .................. 364/900 |
| 4,099,233 | 7/1978 | Barbagelata et al. .................. 364/200 |
| 4,151,592 | 4/1979 | Suzuki et al. .................. 364/200 |

Primary Examiner—Jerry Smith
Assistant Examiner—Jameson Lee
Attorney, Agent, or Firm—Staas & Halsey

[57] ABSTRACT

A data-transfer controlling system comprising a bus-control unit connected to a common bus for controlling data transfer through the bus and a plurality of transmitter/receiver units for transferring data through the common bus to each other. The bus is comprised of a transfer-request signal line connected to each of the transmitter/receiver units, one or two permission-signal lines, for permitting transfer of data by a transmitter/receiver unit which has been generating a transfer-request signal, an acknowledge signal line, and a transfer-end signal line. The bus does not include a busy-interlock signal line, which was included in the prior art. The transmitter/receiver unit which has received the permission signal begins to transfer data when both of the permission signal and the transfer-end signal are terminated.

16 Claims, 8 Drawing Figures

A DATA TRANSFER CONTROL SYSTEM FOR MULTIPLE UNITS ON A COMMON BUS USING A SERIALLY TRANSMITTED TRANSFER PERMISSION SIGNAL

This application arose upon entry into the national stage of prosecution of International Application, Ser. No. PCT/JP80/00137, filed June 19, 1980.

BACKGROUND OF THE INVENTION

This invention relates to a data-transfer controlling system, and more particularly to a system for transferring data between transmitter/receiver units connected to a common bus in which the number of conducting lines included in the common bus is reduced or the processing time for a transmitter/receiver unit to occupy the common bus is shortened.

In general, a data-transfer controlling system includes a plurality of transmitter/receiver units, such as processors, memory devices, input-output devices, etc, commonly connected to a common bus, and also includes a bus-control unit, which unit controls the signals of the transmitter/receiver unit requiring data transfer to be allowed or not allowed on the common bus. This control of allowing or not allowing the signals on the bus is usually executed during the time when a previous data transfer is effected between the transmitter/receiver units. In order to control the signals allowed on the common bus, the common bus in the prior art usually includes signal lines as follows:

(a) Transfer-Request Signal Line (REQ),
(b) Permission-Signal Line (PRM),
(c) Acknowledge-Signal Line (ACK),
(d) Busy-Interlock Signal Line (BSY),
(e) Transfer-End Signal Line (END), and
(f) Data/Address Signal Line (D/A).

However, for the purpose of simplifying the control and decreasing the cost of the common bus, it is desirable to reduce the number of signal lines in the common bus.

In addition, in the prior art system, the permission signal is transferred one after another through transmitter/receiver units connected in series, to a transmitter/-receiver unit which has been providing a transfer-request signal. Therefore, due to the delay time of each transmitter/receiver unit, a relatively long time is required to reach the desired transmitter/receiver unit when a relatively large number of transmitter/receiver units are connected between the bus-control unit and the desired transmitter/receiver unit.

SUMMARY OF THE INVENTION

Accordingly, an object of the present invention is to provide a data-transfer controlling system in which the number of signal lines included in a common bus is reduced by allowing a permission-signal line to have the function of a busy-interlock signal line as well as the function of the permission-signal line itself.

Another object of the invention is to provide a data-transfer controlling system in which a desired transmitter/receiver unit which has been generating a transfer-request signal can be reached in a relatively short time.

According to the present invention, there is provided a data-transfer controlling system comprising a common bus including a plurality of conducting lines, a control unit connected to said common bus for controlling data transfer through said common bus, and a plurality of transmitter/receiver units for transferring data through said common bus to each other, said common bus including at least a transfer-request signal line connected to each of said transmitter/receiver units for conducting a transfer-request signal from a transmitter/receiver unit to said control unit, a permission-signal line for conducting a permission signal from said control unit to said transmitter/receiver unit which has been generating said transfer-request signal, for permitting said transmitter/receiver unit to transfer data, an acknowledge-signal line for conducting an acknowledge signal from a transmitter/receiver unit, which has received said permission signal, to said control unit, and a transfer-end signal line for conducting a transfer-end signal from a transmitter/receiver unit, to said control unit characterized in that: said control unit comprises a permission-signal generating means for generating said permission signal in response to the receiving of said transfer-request signal, wherein said permission signal is terminated in response to the generation of a transfer-end signal in the data-transfer process immediately before the current data-transfer process when said acknowledge signal has been generated before generating a transfer-end signal in said process immediately before said current process, or said permission signal is terminated in response to the generation of said acknowledge signal when said acknowledge signal is generated after the end of the data-transfer process immediately before the current data-transfer process, and whereby the transmitter/receiver unit which has received said permission signal begins to transfer data when both of said permission signal and said transfer-end signal are terminated.

It is advantageous that the bus-control unit includes a first permission signal generating means and a second permission signal generating means, wherein said first permission signal is generated at a predetermined time after the generation of said second permission signal and is terminated when said control unit receives said acknowledge signal, and said second permission signal is generated when said control unit receives said transfer-request signal, wherein said second permission signal is terminated in response to the generation of a transfer-end signal in the data-transfer process immediately before the current data-transfer process when said acknowledge signal is generated before generating a transfer-end signal in said process immediately before said current process, or said second permission signal is terminated in response to the generation of said acknowledge signal when said acknowledge signal is generated after the end of the data-transfer process immediately before the current data-transfer process, and whereby the transmitter/receiver unit which has received said first permission signal begins to transfer data when both of said second permission signal and said transfer-end signal are terminated.

BRIEF DESCRIPTION OF DRAWINGS

These and other objects and advantages of the present invention will best be understood with reference to the accompanying drawings in which.

DESCRIPTION OF THE PREFERRED EMBODIMENT

Figure 1:
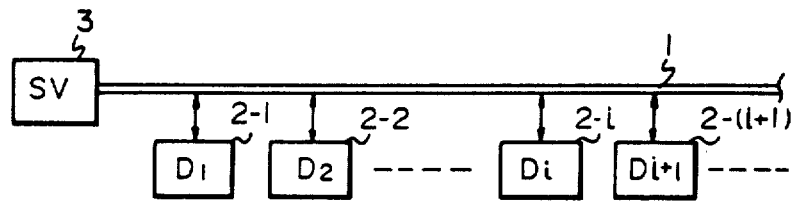
FIG. 1 illustrates a schematic block diagram of a data-transfer system according to one embodiment of the present invention.

Referring to FIG. 1, a schematic block diagram of a data-transfer controlling system according to one embodiment of the present invention is illustrated. In FIG. 1, the data-transfer controlling system is comprised of a common bus 1 including a plurality of signal lines, a plurality of transmitter/receiver units 2-1, 2-2, ..., 2-i, 2-(i+1), ..., and bus-control unit 3 connected to an end of the common bus 1. The transmitter/receiver units 2-1, 2-2, ..., 2-i, 2-(i+1), ... may, for example, be processors, memories or input-output devices. Briefly explaining the operation, the bus-control unit 3 provides a permission signal which is transferred through the common bus 1 to a desired transmitter/receiver unit which has been generating a transfer-request signal. After the desired transmitter/receiver unit receives the permission signal, the transmitter/receiver unit begins to transfer data through the common bus to another transmitter/receiver unit in accordance with the hereinafter described conditions.

Figure 2:
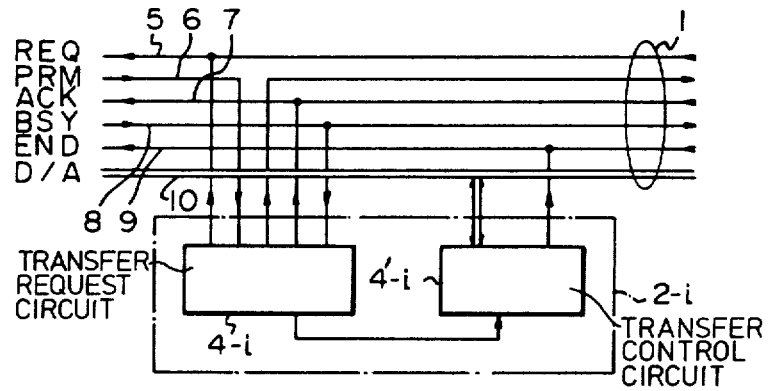
FIG. 2 illustrates a block diagram of a transmitter/-receiver unit connected to a common bus of the prior art.

In the prior art, the construction of a data-transfer controlling system is almost the same as the system of FIG. 1. The difference resides in the constitution of the common bus 1. FIG. 2 illustrates a block diagram of a transmitter/receiver unit connected to a common-bus of the prior-art. As illustrated in FIG. 2, the common bus of the prior art is comprised of a plurality of conducting lines, i.e., a transfer-request signal line 5, a permission-signal line 6, an acknowledge-signal line 7, a busy-interlock signal line 8, a transfer-end signal line 9, and a data/address signal line 10. These conducting lines are connected to each of the transmitter/receiver units 2-1, 2-2, ..., 2-1, 2-(i+1), .... Each transmitter/receiver unit 2-i (i=1, 2, 3, 4, ...) is comprised of a transfer-request circuit 4-i and a transfer-control circuit 4'-i connected to the transfer-request circuit 4-i. The transfer-request signal line 5, the acknowledge signal line 7, and the busy-interlock signal line 8 are directly connected to each transfer-request circuit 4-i. The transfer-end signal line 9 and a data/address signal line 10 are directly connected to each transfer-control circuit 4'-i. The permission-signal line 6 is connected in series one after another to each of the transfer-request circuits 4-1, 4-2, 4-3, ....

Figure 3:
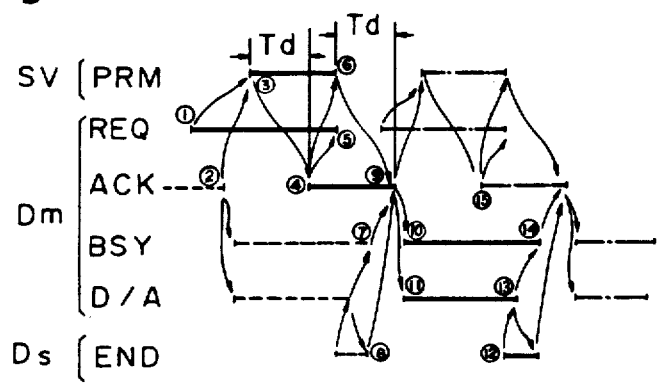
FIG. 3 illustrates a time chart of the data-transfer processes in a prior-art system.

The data-transfer processes in the prior-art system of FIG. 2 are illustrated by a time chart in FIG. 3. In FIG. 3, and in all of the time charts in FIGS. 5 and 8, heavy lines represent a current data-transfer process, dotted lines represent a data-transfer process immediately before the current process, and dash-dot lines represent the next data-transfer/process. The symbol "SV" represents the bus-control unit or, in other words, a supervisor. The symbol "Dm" represents a transmitter/receiver unit which is to receive a permission signal from the bus-control unit to transfer data and may be referred to as a master device. The symbol "Ds" represents a transmitter/receiver unit which is selected by the master device Dm to receive the data transferred from the master device Dm and may be referred to as a slave device. The data-transfer steps are as follows:

(1) When the transmitter/receiver unit Dm, or the master device Dm, generates a transfer-request signal REQ (①), and when an acknowledge signal ACK in the data-transfer process immediately before the current process is terminated, (②), the bus-control unit SV generates a permission signal PRM.

(2) The permission signal PRM is conducted, through the permission-signal line 6 (FIG. 2) and the transmitter/receiver units which are connected between the bus-control unit 3 and the master device Dm and which are not generating any transfer-request signal, to the master device Dm. Therefore, after a delay time Td, due to the transmitter/receiver units which are not generating a transfer-request signal, the master device Dm receives the permission signal. Then, the master device Dm generates an acknowledge signal ACK (④) and turns the transfer-request signal REQ off (⑤).

(3) The generated acknowledge signal ACK is then transferred through the acknowledge-signal line 7 (FIG. 2) to the bus-control circuit 3. When the bus-control circuit 3 detects the acknowledge signal ACK, the permission signal PRM is turned off (⑥). Thus, the transmitter/receiver unit Dm, which is to participate in to the current data-transfer process, is determined.

(4) The determined transmitter/receiver unit Dm is kept waiting until the permission signal PRM in the current process and the busy-interlock signal BSY and the transfer-end signal END in the process immediately before the current process are terminated (⑦, ⑧).

(5) In the process immediately before the current process, when the transfer-end signal, the data/address signal and the busy-interlock signal are turned off, the master device Dm in the current process turns the acknowledge signal off (⑨) and generates a busy-interlock signal BSY (⑩) for inhibiting the other transmitter/receiver units from using the common bus 1. Then, the master device Dm transfers data through the data-/address signal line 10 to a desired slave device Ds (⑪).

(6) When the slave device Ds generates a transfer-end signal (⑫), the master device Dm turns off the data-/address signal (⑬), and the busy-interlock signal (⑭).

(7) During the current process, if a next transfer-request signal REO is generated, as shown by a dash-dot line, the next data-transfer process will be executed as shown by dash-dot lines in the same way as in the current process.

As described above, the data-transfer controlling system of the prior art employs the busy-interlock signal line 8. However, according to the present invention, the busy-interlock signal line can be eliminated.

Figure 4:
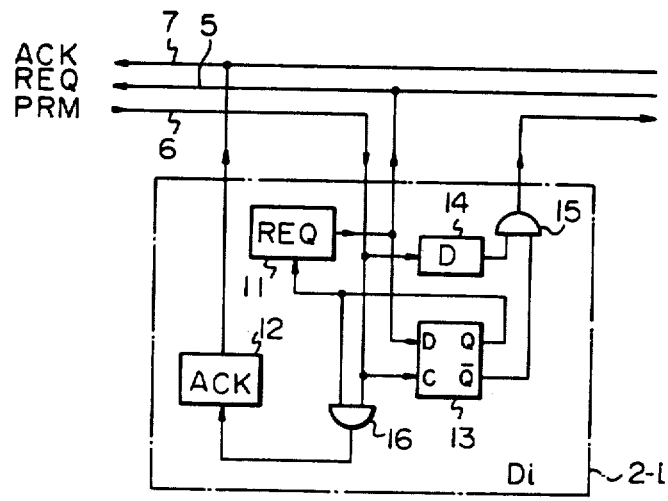
FIG. 4 illustrates a block diagram of a transmitter/receiver unit connected to a common bus according to one embodiment of the present invention.

FIG. 4 illustrates a block diagram of a transmitter/receiver unit connected to a common-bus line according to one embodiment of the present invention. In FIG. 4, each transmitter/receiver unit 2-i is comprised of a transfer-request signal generating circuit 11, an acknowledge-signal generating circuit 12, a D-type flip-flop 13, a delay circuit 14 and AND gates 15 and 16. The output of the transfer-request signal generating circuit 11 is connected to a transfer-request signal line 5 and the data input D of the flip-flop 13. The output Q of the flip-flop 13 is connected to the input of the transfer-request signal generating circuit 11 and one input of the AND gate 16. The permission-signal line 6 is connected to the input of the delay circuit 14 and the other input of the AND gate 16 as well as to the clock input C of the flip-flop 13. The output of the AND gate 16 is connected to the input of the acknowledge-signal generating circuit 12, whose output is connected to the acknowledge-signal line 7. The output of the delay circuit 14 and the reverse output $\overline{Q}$ of the flip-flop are connected respectively to the inputs of the AND gate 15. The output of the AND gate 15 is connected through the permission-signal line 6 to the next transmitter/receiver unit (not shown in FIG. 4).

Figure 5:
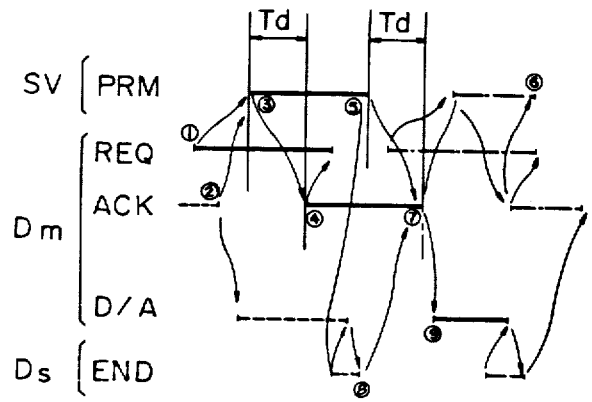
FIG. 5 illustrates a time chart of the data-transfer processes in a data-transfer controlling system according to one embodiment of the present invention.

The operation of the data-transfer controlling system according to this embodiment and partly shown in FIG. 4 will now be described with reference to FIGS. 4 and 5. FIG. 5 illustrates a time chart of the data-transfer processes in the data-transfer controlling system partly shown in FIG. 4. Most of the data-transfer steps according to the embodiment are the same as the prior-art steps (1) through (7) described above. The difference is that the busy-interlock signal line 8 in the prior-art system is not used in the system of this embodiment and thus the number of conducting lines in the common bus is reduced.

The data-transfer steps according to this embodiment are as follows:

(8) When the transfer-request signal generating circuit 11 generates a transfer-request signal REQ ((1) in FIG. 5), the logic "1" from the output of the circuit 11 is applied to the data input D of the flip-flop 13 and through the transfer-request signal line 5 to the bus-control unit 3 (FIG. 1).

(9) The bus-control unit (SV) 3 then generates a permission signal PRM ((3)) in the same way as in the step (1) described before.

(10) The permission signal is then transferred, through the transmitter/receiver units 2-1, 2-2, ... (one after another) which are not generating any transfer-request signal, to the master device (Dm)2-i illustrated in FIG. 4. The logic "1" of the permission signal PRM is thus applied to the clock input C of the flip-flop 13, to the input of the delay circuit 14 and to the one input of the AND gate 16. Thus, the output Q of the flip-flop 13 is set to logic "1" which is applied to another input of the AND gate 16. Accordingly, the AND gate 16 is turned on so that a logic "1" is applied to the acknowledge-signal generating circuit 12. As a result, an acknowldge signal is generated ((4)) from the acknowledge-signal generating circuit 12 and is transferred through the acknowledge-signal line 7 to the bus-control unit 3. Also, the reverse output $\overline{Q}$ of the flip-flop is set to logic "0" which is applied to one input of the AND gate 15. Therefore, the AND gate 15 is not turned on and the permission signal PRM is not transferred through the AND gate 15 to the next transmitter/receiver unit 2-(i+1).

(11) According to this embodiment, the permission signal is terminated in response to the later one of the following two events: when the acknowledge signal is generated in the current process or when the transfer-end signal in the process immediately before the current process is generated. In FIG. 5, the permission signal in the current process is terminated ((5)) in response to the generation of the transfer-end signal in the process immediately before the current process, and the permission signal in the next transfer process is terminated ( 6 ) in response to the generation of the acknowledge signal in the next process.

(12) The acknowledge signal in the current process is turned off ((7)) in response to the earlier one of the following two events: when the permission signal in the current process is terminated ((5)) or when the transfer-end signal in the process immediately before the current process in turned off ((8)).

(13) In response to the termination of the acknowledge signal in the current process, the master device Dm begins to transfer data ((9)).

These steps (8) through (13) are cycled in the next transfer process.

As will be understood from the foregoing description of one embodiment of the invention, the busy-interlock signal line 8 (FIG. 2) in the prior-art system can be eliminated by taking into account the timing of the termination of the permission signal PRM.

However, the data-transfer controlling system of the above-described embodiment, as well as of the prior art, has a disadvantage. That is, the permission-signal generated from the bus-control unit 3 is delayed by a time of about 120 ns through each transmitter/receiver unit. Since the permission signal is transferred one after another through a series of transmitter/receiver units connected to the common bus, the time delays of about 120 ns in each unit accumulate one by one resulting in two time delays Td between the generation of the permission signal from the bus-control unit and the generation of the acknowledge signal from the desired transmitter/receiver unit and between the termination of the permission signal and the termination of the acknowledge signal, as illustrated in FIGS. 3 and 5. When the number of the transmitter/receiver units connected to the common bus is fifteen, the maximum time delay 2Td reaches approximately 4 µs (120 ns×15×2). This time delay is considerably large in comparison with the time required for data transfer after the acknowledge signal has been terminated. The time of data transfer is usually only 1 µs. Therefore, according to the system of FIG. 3 or FIG. 5, the standby time after generating the transfer-request signal is usually much larger than the data-transfer time and thus the efficiency of the data transfer is low.

In order to overcome the disadvantage described above, there is provided another embodiment of a data-transfer controlling system according to the present invention. In this second embodiment, instead of using the busy-interlock signal line as used in the prior-art system, a second permission-signal line is employed so that the delay circuit 14 in a transmitter/receiver unit 2-i illustrated in FIG. 4 can be eliminated and the delay time Td can be shortened. A data-transfer controlling system according to the second embodiment of the invention will now be described in detail in conjunction with FIGS. 6, 7 and 8.

Figure 6:
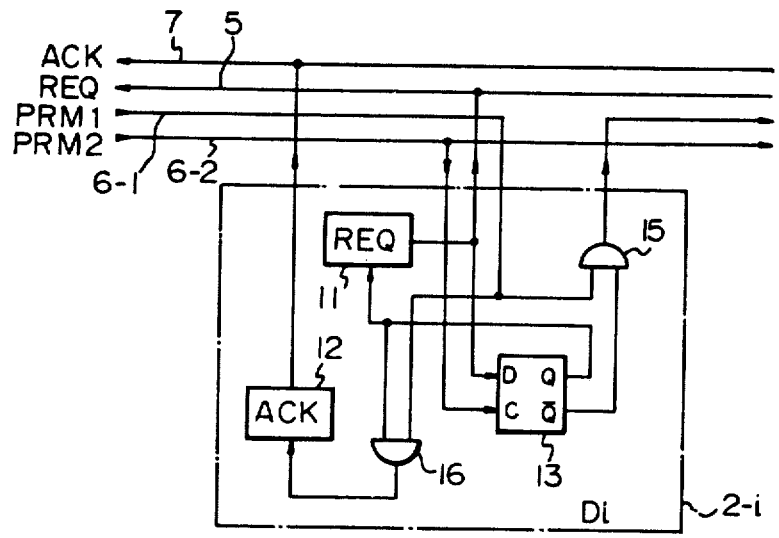
FIG. 6 illustrates a block diagram of a transmitter/receiver unit connected to a common bus according to another embodiment of the invention.

FIG. 6 illustrates a block diagram of a transmitter/receiver unit connected to a common-bus line according to the second embodiment. In comparison with the block diagram of FIG. 4, the common-bus line of FIG. 6 includes a first permission-signal line (PRM 1) 6-1 and a second permission-signal line (PRM2) 6-2, and the delay circuit 14 in FIG. 4 is eliminated in FIG. 6. In FIG. 6, the same reference numbers used in FIG. 4 are applied to the corresponding circuit elements. The first permission-signal line 6-1 is connected directly (not through the delay circuit 14 of FIG. 4) to one input of the AND gate 15 and to the input of the AND gate 16. The second permission-signal line 6-2 is connected to the clock input C of the D-type flip-flop 13. The other connecting relations are the same as the system of FIG. 4.

Figure 7:
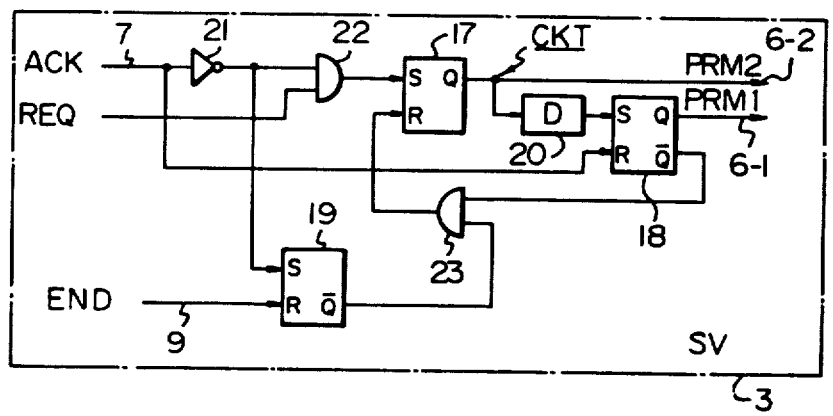
FIG. 7 illustrates a block diagram of a bus-control unit connected to the common bus of FIG. 6.

FIG. 7 illustrates a block-diagram of a bus-control unit (SV) 3 connected to the common-bus of FIG. 6. In FIG. 7, the bus-control unit (SV) 3 is comprised of set-reset flip-flops 17, 18 and 19, a delay circuit 20, a NOT gate 21, and AND gates 22 and 23. The acknowledge-signal line 7 is connected to the reset input of the flip-flop 18 and also is connected through the NOT gate 21 to one input of the AND gate 22 and to the set input of the flip-flop 19. The transfer-request signal line 5 is connected to the other input of the AND gate 22. The output of the AND gate 22 is connected to the set input S of the flip-flop 17, whose output Q is connected to the second permission-signal line 6-2 and to the input of the delay circuit 20. The output of the delay circuit 20 is connected to the set input S of the flip-flop 18, whose output Q is connected to the first permission-signal line 6-1 and whose other output $\overline{Q}$ is connected to one input of the AND gate 23. The transfer-end signal line 9 is connected to the reset input of the flip-flop 19 whose, output $\overline{Q}$ is connected to another input of the AND gate 23. The output of the AND gate 23 is connected to the reset input R of the flip-flop 17.

Figure 8:
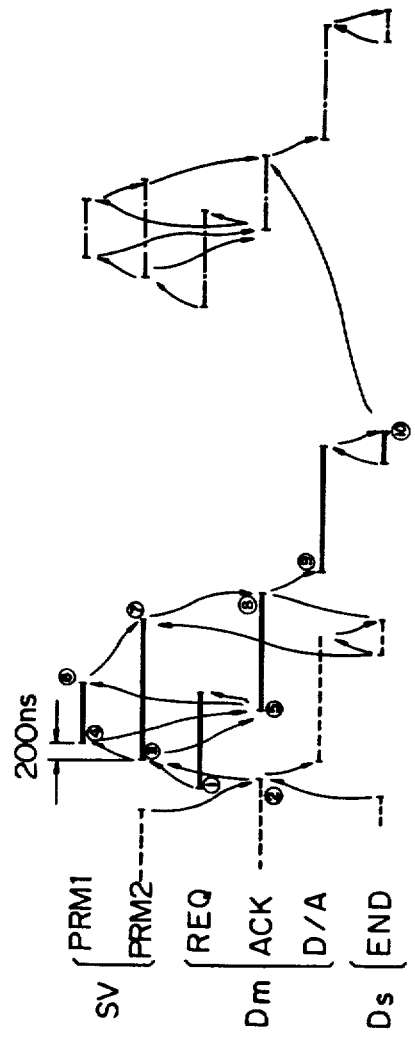
FIG. 8 illustrates a time chart of the data-transfer processes in a data-transfer controlling system according to another embodiment of the invention.

The operation of the data-transfer controlling system according to the second embodiment and partly shown in FIGS. 6 and 7 will now be described with reference to FIGS. 6, 7 and 8. FIG. 8 illustrates a time chart of the data-transfer process in the data-transfer controlling system partly shown in FIGS. 6 and 7. The data-transfer steps according to the second embodiment are as follows:

(14) When the transfer-request signal generating circuit 11 in FIG. 6 generates a transfer-request signal REQ (①) indicated in FIG. 8), and when the logic level of the acknowledge-signal line (ACK) 7 is "0" (②), the AND gate 22 is turned on so that a logic "1" is applied to the set input S of the flip-flop 17 (FIG. 7), resulting in the logic "1" of the second permission-signal line (PRM2) 6-2 (③).

(15) The logic "1" of the PRM2 is then applied through the delay circuit 20 to the set input S of the flip-flop 18 so that the first permission-signal line (PRM1) 6-1 is turned to logic "1" (④). The delay time by the delay circuit 20 is, for example, about 200 ns.

(16) When the logic "1" of the PRM2 is applied to the clock input C of the flip-flop 13 (FIG. 6), the output Q is set to logic "1" because the data input D of the flip-flop 13 has already been set to logic "1" by the transfer-request signal.

(17) The logic "1" of the output Q of the flip-flop 13 and the logic "1" of the PRM1 are applied to both inputs of the AND gate 16 (FIG. 6). Thus, a logic "1" is applied to the acknowledge-signal generating circuit 12 resulting in the acknowledge signal (ACK) (⑤).

(18) At the same time, since the reverse output $\overline{Q}$ of the flip-flop 13 is logic "0", the AND gate 15 is not turned on and thus the first permission signal is not transferred to the next transmitter/receiver unit 2-(i+1).

(19) When the acknowledge signal is received by the reset input R of the flip-flop 18, the logic level of the outputs Q and $\overline{Q}$ of the flip-flop 18 are turned to "0" and "1" respectively. As a result, the first permission signal (PRM1) 6-1 is turned off (⑥).

(20) Then, when the transfer-end signal is generated in the process immediately before the current process during the time the acknowledge signal is continued, as illustrated in the left side process in the time chart of FIG. 8, the transfer-end signal is applied to the reset input R of the flip-flop 19 so that the logic level of the reverse input $\overline{Q}$ of the flip-flop 19 is turned to "1". Thus, by the logic level "1" from the outputs $\overline{Q}$ of the flip-flops 18 and 19, the AND gate 23 is turned on to apply a logic "1" to the reset input R of the flip-flop 17. As a result, the second permission signal (PRM2) 6-2 from the output Q of the flip-flop 17 is turned off (⑦).

(21) In response to the termination of the second permission signal or the termination of the transfer-end signal in the process immediately before the current process, the acknowledge signal is terminated (⑧). Then, data transfer is executed by means of the data/address-signal line (⑨).

(22) If the transfer-end signal in the current process has been generated before the generation of the acknowledge signal in the next process, as illustrated in the right hand side of FIG. 8 (⑩), the first permission signal (PRM1) and the second permission signal (PRM2) are both turned off in response to the generation of the acknowledge signal (⑪ and ⑫). This operation results because, in that case, the output $\overline{Q}$ of the flip-flop 19 (FIG. 7) is held to logic "1" after the generation of the transfer-end signal unless a logic "1" is applied to the set input S of the flip-flop 19, the AND gate 23 is immediately turned on when the acknowledge signal is applied through the flip-flop 18 to the input of the AND gate 23 so that the logic level of the output Q of the flip-flop 17 is turned to "0".

As will be easily understood by one skilled in the art, if the transfer-request signal generating circuit 11 of FIG. 6 is not generating the transfer-request signal, the input D of the flip-flop 13 is logic "0" and thus, in this condition, even when the second permission signal is applied to the clock input C of the flip-flop 13, the output $\overline{Q}$ of the flip-flop 13 is kept to logic "1" so that the first permission signal (PRM1) is transferred through the AND gate 15 to the next transmitter/receiver unit 2-(i+1).

In the foregoing description of the second embodiment of the invention, since the delay circuit 14 in each transmitter/receiver unit of FIG. 4 is eliminated, the delayed time through one transmitter/receiver unit is greatly descreased to about 30 ns. Therefore, if fifteen transmitter/receiver units are connected to the common bus, the maximum time delay is the sum of the delay time of the delay circuit 20 in FIG. 8 and of the all transmitter/receiver unit, and is equal to 200 ns plus 30 ns×15×2, which is only about 1 µs. On the contrary, the maximum delay time in the system of FIG. 4 was about 4 µs, as described before. Thus, according to the second embodiment, the data-transfer controlling time is greatly reduced.

What is claimed is:

1. A data-transfer controlling system, comprising:
   a common bus having a transfer-request signal line, a permission signal line, an acknowledge signal line, a transfer-end signal line, and at least one data/address signal line;
   a control unit connected to said common bus to control data transfer through said common bus, said control unit having permission signal generating means connected to said permission signal line for generating a permission signal; and a plurality of transmitter/receiver units which transfer data through said common bus to each other, said transmitter/receiver units being connected serially to said permission signal line and being connected in parallel to the remaining lines of said common bus, each transmitter/receiver unit having transfer-request signal generating means connected to said transfer-request signal line for generating a transfer-request signal, acknowledge signal generating means connected to said acknowledge signal line for generating an acknowledge signal, transfer-end signal generating means connected to said transfer-end signal line for generating a transfer-end signal, and means responsive to said transfer-request signal generating means and to said permission signal line for transferring said permission signal through said transmitter/receiver unit to the next transmitter/receiver unit when said means receives said permission signal if said transfer-request signal is not being generated by the transfer-request signal generating means of the same transmitter/receiver unit and for triggering said acknowledge signal generating means as well as inhibiting transfer of said permission signal to the next transmitter/receiver unit when said means receives said permission signal if said transfer-request signal is being generated by the transfer-request signal generating means of the same transmitter/receiver unit, wherein a data-transfer process is executed when a first transmitter/receiver unit generates a transfer-request signal to indicate a request for utilization of said at least one data/address line so that data can be exchanged with a second transmitter/receiver unit, the transfer-request signal being terminated when the acknowledge signal is generated; the permission signal from the control unit is transmitted serially through the transmitter/receiver units until it reaches said first transmitter/receiver unit, which thereupon generates an acknowledge signal, the acknowledge signal being terminated when there is no permission signal on the permission signal line or when there is no transfer-end signal on the transfer-end signal line; when said first transmitter/receiver unit stops generating the acknowledge signal, it addresses the second transmitter/receiver unit and exchanges data with it; and the data-transfer process is completed when said second transmitter/receiver unit generates a transfer-end signal on the transfer-end signal line after the data has been exchanged, whereupon the first transmitter/receiver unit ceases to address the second transmitter/receiver unit, which then terminates the transfer-end signal, and wherein the permission signal generating means of the control unit includes means for generating said permission signal in response to the receiving of said transfer-request signal if an acknowledge signal is not present on the acknowledge signal line and for terminating said permission signal in response to one of (a) the generation of the next transfer-end signal if said acknowledge signal has been generated before the previous data-transfer process is completed, and (b) the generation of the next acknowledge signal if it is generated after the previous data-transfer process is completed, so that each transmitter/receiver unit can generate a request signal to initiate a data-transfer process even when other transmitter/receiver units are exchanging data.

2. A data-transfer controlling system as claimed in claim 1, wherein said means responsive to said transfer-request signal generating means and to said permission signal line comprises a D-type flip-flop whose data input (D) is connected to said transfer-request signal line, whose clock input (C) and one input of a first AND gate are connected to said permission signal line, whose first output (Q) is connected through another input of said first AND gate to the input of said acknowledge-signal generating means, and whose second output ($\overline{Q}$) is connected to one input of a second AND gate which receives at another input said permission signal through a delay means.

3. A data-transfer controlling system, comprising:

a common bus having a transfer-request signal line, a first permission signal line, a second permission signal line, an acknowledge signal line, a transfer-end signal line, and at least one data/address signal line;

a control unit means connected to said common bus for controlling data transfer through said common bus, said control unit means having means for generating a first permission signal and a second permission signal, the first permission signal being applied to the first permission signal line and the second permission signal being applied to the second permission signal line; and a plurality of transmitter/receiver units which transfer data through said common bus to each other, said transmitter/receiver units being connected serially to said first permission signal line and being connected in parallel to the remaining lines of said bus, each transmitter/receiver unit having a transfer-request signal generating means connected to said transfer-request signal line for generating a transfer-request signal, acknowledge signal generating means connected to said acknowledge signal line for generating an acknowledge signal, transfer-end signal generating means connected to said transfer-end signal line for generating a transfer-end signal, and means for transferring said first permission signal to the next transmitter/receiver unit when said means receives said first permission signal if said transfer-request signal is not being generated by the transfer-request signal generating means of the same transmitter/receiver unit and for triggering said acknowledge signal generating means as well as for inhibiting transfer of said first permission signal to the next transmitter/receiver unit when said means receives said first permission signal if said transfer-request signal is being generated by the transfer-request signal generating means of the same transmitter/receiver unit, wherein a data-transfer process is executed when a first transmitter/receiver unit generates a transfer-request signal to indicate a request for utilization of said at least one data/address line so that data can be exchanged with a second transmitter/receiver unit, the transfer-request signal being terminated when the acknowledge signal is generated; the first permission signal from the control unit means is transmitted serially through the transmitter/receiver units until it reaches said first transmitter/- receiver unit, which thereupon generates an acknowledge signal, the acknowledge signal being terminated when one of a second permission signal on the second permission signal line and a transfer-end signal on the transfer-end signal line terminates; when said first transmitter/receiver unit stops generating the acknowledge signal, it addresses said second transmitter/receiver unit and exchanges data with it; and the data-transfer process is completed when said second transmitter/receiver unit generates a transfer-end signal on the transfer-end signal line after the data has been exchanged, whereupon the first transmitter/receiver unit ceases to address the second transmitter/receiver unit, which then terminates the transfer-end signal, and wherein the means for generating a first permission signal and a second permission signal includes a first permission signal generating means for generating said first permission signal and a second permission signal generating means for generating said second permission signal, said first permission signal being generated at a predetermined time after the generation of said second permission signal and being terminated when said control unit means receives said acknowledge signal, and said second permission signal being generated when said control unit means receives said transfer-request signal and there is no acknowledge signal on the acknowledge signal line and being terminated in response to one of (a) the generation of the next transfer-end signal if said acknowledge signal is generated before the previous data-transfer process is completed, and (b) the generation of the next acknowledge signal if it is generated after the previous data-transfer process is completed, so that each transmitter/receiver unit can generate a request signal to initiate a data-transfer process even when other transmitter/receiver units are exchanging data.

4. A data-transfer controlling system as claimed in claim 3, wherein said means for transferring said first permission signal to the next transmitter/receiver unit when said means receives said first permission signal if said transfer-request signal is not being generated by the transfer-request signal generating means of the same transmitter/receiver unit and for triggering said acknowledge signal generating means as well as for inhibiting transfer of said first permission signal to the next transmitter/receiver unit when said means receives said first permission signal if said transfer-request signal is being generated by the transfer-request signal generating means of the same transmitter/receiver unit comprises a D-type flip-flop whose data input (D) is connected to said transfer-request signal line means, whose clock input (C) is connected to said second permission signal line, whose first output (Q) is connected to one input of a first AND gate whose another input is connected to said first permission signal line, the output of said first AND gate being connected to the input of said acknowledge-signal generating means, and whose second output ($\overline{Q}$) is connected to one input of a second AND gate which receives at another input said first permission signal.

5. A data-transfer controlling system as claimed in claim 3, wherein said first and second permission signal generating means together comprise a circuit having first means for providing said second permission signal when said transfer-request signal is applied to said first means if said acknowledge signal is not being generated, said first means being responsive to the signals on said transfer-request and acknowledge signal lines and including means for determining whether said acknowledge signal and said transfer-request signal are simultaneously present, and second means connected to said first means for providing said first permission signal when said second permission signal is applied through a delay circuit to said second means.

6. A data-transfer controlling system as claimed in claim 5, wherein said second means terminates said first permission signal when it receives said acknowledge signal.

7. A data-transfer controlling system as claimed in claim 5, wherein said first means terminates said second permission signal when it receives said acknowledge signal if said transfer-end signal has been generated.

8. An improved data-transfer controlling system of the type wherein a bus-control unit is connected to a bus to control the transfer of data between a plurality of transmitter/receiver units connected to the bus, with a first transmitter/receiver unit addressing a second transmitter/receiver unit and exchanging data with it after first emitting a transfer-request signal to the bus control unit, receiving a permission signal from the bus-control unit, and emitting an acknowledge signal, said bus including at least first and second conductors connecting the transmitter/receiver units in parallel and a third conductor serially connecting the transmitter/receiver units, wherein the improvement comprises:

each transmitter/receiver unit includes a transfer request signal generating unit having an input and having an output connected to the second conductor of said bus to convey said transfer-request signal to the bus-control unit; an acknowledge signal generating unit having an input and having an output connected to the first conductor of of the bus to convey said acknowledge signal to the control unit; and means for conveying the permission signal to the next transmitter/receiver unit unless said transfer-request signal is being emitted by the transfer-request signal generating unit of the same transmitter/receiver unit, in which case said means triggers said acknowledge signal generating unit to emit said acknowledge signal to the control unit over said first conductor, said means including a first gate having first and second inputs and having an output connected to another transmitter/receiver unit via the third conductor of the bus, a second gate having first and second inputs and having an output connected to the input of the acknowledge signal generating unit, the first input of the second gate being connected via the third conductor of the bus to another transmitter/receiver unit that is different from the transmitter/receiver unit to which the output of the first gate is connected, a first storage device having a first input and first and second outputs, the first input of the first storage device being connected to the second conductor of the bus, the first output being connected to the second input of the second gate and to the input of the transfer-request signal generating unit, and the second output being connected to the first input of the first gate, and means for conveying an electrical signal from the first input of the second gate to the second input of the first gate.

9. The system of claim 8, wherein said first storage device additionally has a second input connected to the first input of the second gate, and wherein the means for conveying an electrical signal comprises a delay circuit connecting the first input of the second gate and the second input of the first gate.

10. The system of claim 7, wherein the first and second gates are two-input AND gates and the first storage device is a delay flip-flop, the first and second inputs thereto being D and clock inputs, respectively, and the first and second outputs thereof being Q and $\overline{Q}$ outputs, respectively.

11. The system of claim 9, wherein the bus includes at least a fourth conductor to convey an additional permission signal from the bus control unit connecting the transmitter/receiver units in parallel, wherein the first storage device additionally has a second input connected to the fourth conductor of the bus, and wherein the means for conveying an electrical signal comprises a conductor connecting the first input of the second gate and the second input of the first gate.

12. The system of claim 8, wherein the first and second gates are two-input AND gates and the first storage device is a delay flip-flop, the first and second inputs thereto being D and clock inputs, respectively, and the first and second outputs thereof being Q and $\overline{Q}$ outputs, respectively.

13. The system of claim 11, wherein the bus-control unit comprises a second storage device having a first input and having a first output connected to the fourth conductor of the bus, a third storage device having a first input and having a first output connected to the first conductor of the bus, a delay circuit connecting the first output of the second storage device to the first input of the third storage device, and means responsive to the first and second conductors of the bus for generating a signal for the first input of the second storage device when the potentials on the first and second conductors of the bus are substantially different.

14. The system of claim 13, wherein the third storage device has a second input which is connected to the first conductor of the bus, and wherein the means responsive to the first and second conductors of the bus comprises an AND gate having first and second inputs and having an output connected to the first input of the second storage device, the second input of the AND gate being connected to the second conductor of the bus, and an inverter having an input connected to the first conductor of the bus and an output connected to the first input of the AND gate.

15. The system of claim 14, wherein the second storage device has a second input, wherein the third storage device has a second output, wherein the bus includes at least a fifth conductor connecting the transmitter/receiver units in parallel, and wherein the bus-control unit additionally comprises a fourth storage device having an output and having first and second inputs, the first input of the fourth storage device being connected to the output of the inverter and the second input of the fourth storage device being connected to the fifth conductor of the bus, and an AND gate having an output connected to the second input of the second storage device, a first input connected to the second output of the third storage device, and a second input connected to the output of the fourth storage device.

16. The system of claim 15, wherein the second, third and fourth storage devices are set-reset flip-flops, the first input of each of the second, third, and fourth flip-flops being the set input, the second input of each of the second, third, and fourth flip-flops being the reset input, the first output of each of the second and third flip-flops being the Q output, and the output of the fourth flip-flop and the second output of the third flip-flop being the $\overline{Q}$ output.

* * * * *

UNITED STATES PATENT AND TRADEMARK OFFICE
CERTIFICATE OF CORRECTION

PATENT NO. : 4,471,425
DATED : SEPTEMBER 11, 1984
INVENTOR(S) : TAIHEI YAMAGUCHI ET AL.

It is certified that error appears in the above-identified patent and that said Letters Patent is hereby corrected as shown below:

FRONT PAGE, [57] ABSTRACT,
              line 8, "lines," should be --lines--.

Col. 4, line 34, delete "to";
       line 55, "REO" should be --REQ--.

Col. 5, line 34, "(①)" should be --(①)--.

Col. 6, line 5, "( 6 )" should be --(⑥)--.

Col. 8, line 28, delete "(⑪ and ⑫)".

Col. 12, line 39, delete "of" (first occurrence).

Col. 13, line 7, "7" should be --9--;
       line 13, "9" should be --8--.

*Signed and Sealed this*

*Ninth Day of April 1985*

[SEAL]

Attest:

DONALD J. QUIGG

*Attesting Officer*    *Acting Commissioner of Patents and Trademarks*